United States Patent
Yee et al.

[19]

[11] Patent Number: 6,085,090
[45] Date of Patent: Jul. 4, 2000

[54] AUTONOMOUS INTERROGATABLE INFORMATION AND POSITION DEVICE

[75] Inventors: David Moon Yee, Scottsdale; Robert Henry Bickley, Paradise Valley; Philip John Zucarelli, Glendale; Theodore Woolley Keller; Jeff Scott Osman, both of Scottsdale, all of Ariz.

[73] Assignee: Motorola, Inc., Schaumburg, Ill.

[21] Appl. No.: 08/954,259

[22] Filed: Oct. 20, 1997

[51] Int. Cl.[7] .............................. H04Q 7/20; H04Q 7/00; G01S 3/02
[52] U.S. Cl. ..................... 455/440; 455/439; 455/436; 455/456; 370/331; 342/450; 342/457
[58] Field of Search ..................... 455/439, 436, 455/525, 456, 440; 370/331; 342/450, 457

[56] References Cited

U.S. PATENT DOCUMENTS

| | | | |
|---|---|---|---|
| 5,418,537 | 5/1995 | Bird | 342/357 |
| 5,715,297 | 2/1998 | Wiedeman | 379/60 |
| 5,777,580 | 7/1998 | Janky et al. | 342/457 |
| 5,839,088 | 11/1998 | Hancock et al. | 701/213 |

*Primary Examiner*—Fan S. Tsang
*Assistant Examiner*—Sheila Smith
*Attorney, Agent, or Firm*—Bradley J. Botsch

[57] ABSTRACT

An autonomous interrogatable information and position device combines the functionality of a satellite communications device capable of sending and receiving voice and digital data messages, a geo-location device capable of self-determining its positional location; an input/output port configured to allow attachment of the device to external local site sensors or equipment in order to obtain external local site sensor data or control the equipment, and a control processor capable of monitoring and responding to positional location information, input sensor data, and incoming voice and digital data messages.

48 Claims, 3 Drawing Sheets

AUTONOMOUS INTERROGATABLE INFORMATION AND POSITION DEVICE

FIELD OF THE INVENTION

The present invention pertains to portable communication devices and more particularly to an autonomous interrogatable information and position device for use in applications which require tracking of and or monitoring of remote entities on or near the surface of the earth.

BACKGROUND OF THE INVENTION

Breakthroughs in telecommunication technology in recent years has led to greatly improved telecommunication infrastructures. In particular, the advent of satellite communication networks has greatly improved global communication capabilities. Point-to-point, or "bent pipe" satellite communication systems, such as the one described in U.S. Pat. No. 4,720,873 to Goodman et al., provide fast economical communication service and improve the range of communication links over conventional land line communication systems by allowing the path of the communication link to be anywhere within view of (i.e., within the "footprint" of) the satellite. Satellite cellular telephone communication systems, such as the one shown in U.S. Pat. No. 5,410,728 to Bertiger et al., and commercially known as the IRIDIUM™ satellite communications system developed by Motorola, Inc. in Chandler, Ariz., improve over bent pipe satellite communication systems by providing global coverage and inter-satellite communication link capabilities. Thus, a subscriber unit of this system may communicate with any other subscriber unit or entity coupled to a public switched telephone network (PSTN) on or near the surface of the Earth. In each of the satellite communication systems just described or currently available, however, the location of both ends of the communication link (i.e., the calling party or caller and called party or callee) must be known in order to establish and maintain the communication link.

There are many applications, however, in which it would be desirable to establish a communication link and yet the location of the callee is unknown. The location of a callee may be unknown, for example, when the callee is in an unserviced or remote area (if global coverage is not provided), or where the callee is lost or incapable of reporting its location.

In addition, there are many occasions where the callee knows its location but it is undesirable for it to transmit its location. An example situation may be where it is desired to recover a lost person or device, and yet it would imperil the lost person or device to reveal the location.

There are also numerous applications in which it would be desirable to communicate via means other than voice. Examples of such situations include where it is desired to collect and or send data or control signals to a remote unmanned location or device, or when no response is received after attempting to communicate via voice.

Finally, there are many applications where portability and or mobility is desired. This may be useful, for example, in tracking changing conditions encountered by a remote moving entity.

Accordingly, a need exists for a method and apparatus for providing autonomous voice and or data communication, especially one for providing precise positional location self-determination capability without externally revealing the location, and for allowing remote sensor information to be collected and or acted upon, and for controlling an external device or equipment.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

In accordance with the present invention a method and apparatus are provided for autonomously communicating voice and or data, which may include the precise positional location of a callee without externally revealing such location, and for allowing remote sensor information to be collected and or acted upon, and for controlling external device or equipment. The apparatus of the present invention is an autonomous interrogatable information and position device which combines a satellite communications device, a geo-location device, and appropriate command and control resources in a functional subsystem. The device of the present invention may interface and communicate with local site sensors configured to detect conditions of interest at a local site. Furthermore, the device of the present invention may act upon either remote commands or internal preprogrammed operational sequences to process the information received from the sensors and geo-location device. Still further, the device of the present invention may be configured to output control signals and data to a local site device or equipment. Even further, the device of the present invention may communicate the positional location, input sensor data, or operational sequence results to an interested party or parties via the satellite communications telephone system.

In a preferred embodiment, the device of the present invention combines the functionality of two separate antennas into a single L band antenna. Also in this design, the functionality of the geo-location device and the satellite communications device are integrated into a single device. These design features serve to decrease the size and cost of the device, as well as improves portability. In addition, the use of a passive GPS receiver in the preferred embodiment provides location confidentiality in that the GPS receiver need not divulge its positional location in order to determine its location. Also, the preferred embodiment device of the present invention provides a unique power controller in order to conserve power by maintaining essential portions of the device in a sleep mode until an activation signal is received, waking up the essential portions of the device and switching on only other non-essential portions of the device that are necessary for performing a particular function upon receipt of an activation signal, and then switching the essential portions back into sleep mode and switching off the other non-essential portions after the function has been, performed.

Figure 1:
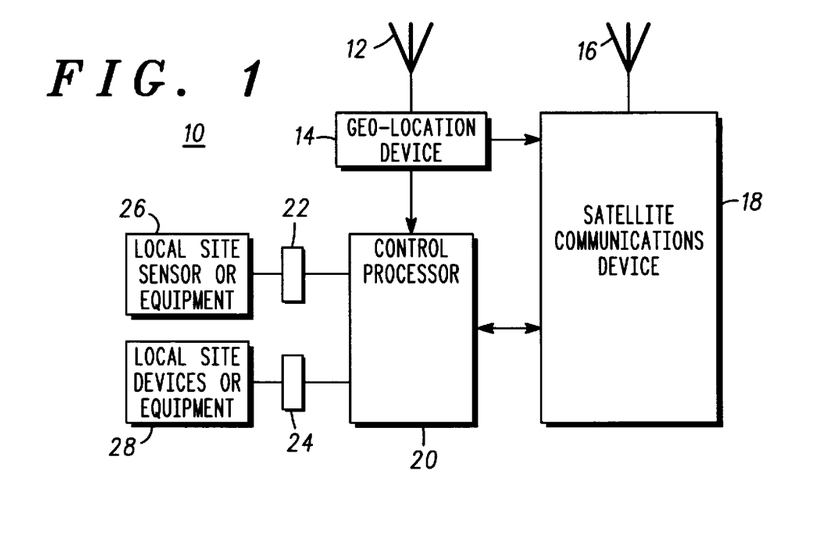
FIG. 1 is a block diagram of an autonomous interrogatable information and position device in accordance with the present invention.

FIG. 1 is a block diagram of a device in accordance with the present invention. As shown in FIG. 1, the autonomous interrogatable information and position device, shown generally at 10, includes a geo-location device 14 coupled to an antenna 12, a satellite communications device 18 coupled to an antenna 16, and a control processor 20 coupled to both geo-location device 14 and satellite communications device 18.

The geo-location device 14 is configured to determine its absolute positional location without revealing its location external to the device 10. The geo-location device 14 is preferably implemented with a Global Positioning System (GPS) receiver, which is known in the art, commercially available, and discussed hereinafter in conjunction with the description of the preferred embodiment. The GPS receiver passively receives positioning signals known as "ephemeris data" that are continuously transmitted from a GPS satellite constellation (not shown), and translates the ephemeris data into the absolute positional location of the GPS receiver relative to the center of the Earth.

The control processor 20 is coupled to at least an input port 22 which may be configured to couple to local site sensors or equipment 26. Sensor data collected by local site sensors or equipment 26 may be read via the input port 22. In the preferred embodiment, the control processor 20 is also coupled to an output port 24 which may be configured to couple to local site devices or equipment 28 to allow data and control signals to be output to the local site devices or equipment 28. As will be appreciated by one skilled in the art, the input port 22 and output port 24 may be combined into a single I/O port, and may further include bidirectional lines for both transmitting and receiving signals. The configuration of the I/O port will typically depend on the type of connections and data transmission required by the local site sensors or equipment 26 and local site devices or equipment 28. Additionally, the local site sensors or equipment 26 and local site devices or equipment 28 may be a single combined apparatus or may include a plurality of such devices.

The satellite communications device 18 is configured to send and receive digital messages to a satellite communications network (not shown) in the form of packets. The satellite communications network is preferably, but not limited to, a global-coverage satellite network such as the IRIDIUM™ satellite network, which is known in the art, commercially available, and discussed hereinafter in conjunction with the description of the preferred embodiment. Packets generally include a header portion and a message portion. The header portion of a packet typically contains routing information and other pertinent data relating to the type of message or synchronization information. The contents of the message portion is the purpose of the message. The message portion may contain digitized voice data or command or control data. As used herein, a message which requires a response to be returned to the message sender is termed an interrogation message. Example interrogation messages include a request for positional location, a request for site sensor data, or a request for internal device status. A message that is generated by the autonomous interrogatable information and position device which contains a response to an interrogation message is herein termed a response message. All other messages received by the autonomous interrogatable information and position device which contain command or control data are herein termed command/control messages, and all messages which contain voice data are herein termed voice messages.

The satellite communications device 18 is configured to receive signals, typically radio frequency (RF) signals, from a satellite communications network (not shown) via antenna 16 and to extract digitized packets addressed to the device 10 from the received signals. The satellite communications device 18 removes the header information from the digitized packet, de-interleaves the message portion from other data, performs decryption if applicable, and routes the message portion to the appropriate portion of the autonomous interrogatable information and position device. For example, if the message is a voice message, it may be routed to a voice processor and speaker included in the satellite communication device. If the message is an interrogation message or command/control message, it is preferably routed to the control processor 20.

The satellite communications device 18 is also configured to format messages to be transmitted to the satellite communications network (not shown) into digitized packets and to transmit the digitized packets preferably as an RF signal via antenna 16. In this regard, the satellite communications device 18 encrypts the message if applicable, interleaves the message portion with other data, adds header information, and then modulates the digitized packet with an RF carrier.

The control processor 20 may be designed with as much or as little intelligence as the desired application requires. For example, the control processor 20 may simply operate as a feed through device which simply responds to interrogation messages for obtaining the positional location of the device from geo-location device 14 or local site sensor data via input port 22 and returning the requested information via a response message. Alternatively, the control processor 20 may be configured with preprogrammed operational sequences to process positional location or site sensor data, or perform operational control of the autonomous interrogatable information and position device (e.g., setting up the device to automatically report its positional location or other sensor data at periodic intervals, enabling/disabling encryption, changing an encryption key, generating control signals to be output to local site devices or equipment 28 via the output port 24). Results of preprogrammed operational sequences may be transmitted at the initiation of the device itself, or in response to an interrogation message.

It will be appreciated by those skilled in the art that the combination of a geo location device 14 having the capability of determining its positional location without transmitting its location external to the device, a satellite communications device 18 for transmitting and receiving both voice and data messages, and a control processor 20 configured to control the geo-location device 14 and satellite communication device 18 and which is coupled to an I/O port 22, 24 capable of coupling to external site sensors, devices or equipment 26, 28, all combined as a single autonomous device transcends the communication possibilities available today. Using the device of the present invention, a remote caller may access the autonomous interrogatable information and position device 10 via the satellite communication device 18 and request the positional location of the device 10 as indicated by the geo-location device 14. In addition, the device 10 may be programmed to report its location as indicated by the geo-location device 14 at intervals or times as commanded by the control processor 20 via an internal preprogrammed operational sequence or a command message received by the satellite communications device 18. Also, the device 10 of the present invention may be commanded via a command message sent to the satellite communications device to access all, or selected ones of, local site sensors or equipment 26, 28 and either report the accessed information by way of the satellite communications device 18 or process the information in some preprogrammed manner in the control processor 20 and report the result in the same manner. The device 10 of the present invention may also be preprogrammed to report, or process and report, the information as just described at intervals or times controlled by the control processor 20. The control processor 20 may be also preprogrammed to initiate a call via the satellite communications device 18 to one or more predetermined telephone numbers upon detection of certain conditions of local site sensors or equipment 26, 28, measured locations or location sets as sensed by the geo-location device 14, detected times, or combinations of these. In addition, the device of the present invention may pass information or commands to its own local command processor 20 from a remote location via the satellite communications device or to any one of, or set of, local site sensors or equipment. Finally, the capability to process conventional voice calls may or may not be retained and access to this or other functions may be controlled by protocols resident in the control processor.

Figure 2:
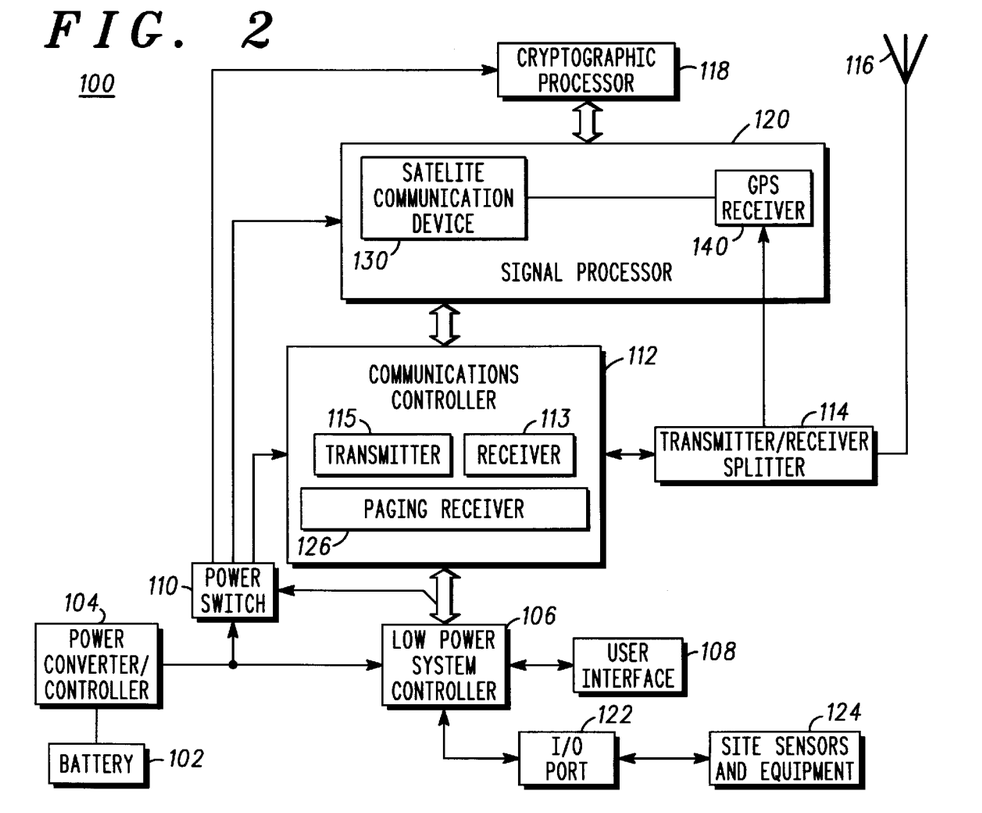
FIG. 2 is a more detailed block diagram of the autonomous interrogatable information and position device of FIG. 1, illustrating one contemplated embodiment of the invention.

FIG. 2 is a more detailed block diagram of an autonomous interrogatable information and position device 100 in accordance with one contemplated preferred embodiment of the invention. As shown in FIG. 2, the autonomous interrogatable information and position device 100 includes a system controller 106, a communications controller 112, and a signal processor 120. As shown in FIG. 2, the signal processor 120 combines the functionality of a satellite communications device 130 and a geo-location device 140.

In the preferred embodiment, communication is provided via the IRIDIUM™ satellite communications network, developed by the Satellite Communications Division (SATCOM) of Motorola, Inc. in Chandler, Ariz. The IRIDIUM™ satellite communications network is an array of low earth orbit satellites arranged to orbit the earth so as to provide substantially world-wide cellular radio coverage. Voice and data may be transmitted via the IRIDIUM™ satellite communications network using an IRIDIUM™ subscriber unit (ISU). An ISU may call another ISU or an entity connected to a public switched telephone network (PSTN) by dialing a conventional telephone number. The call request is transmitted to an IRIDIUM™ satellite via a subscriber-unit-to-satellite link. The satellite routes the call through the IRIDIUM™ satellite communications network to a satellite in view of the destination ISU or local IRIDIUM™ gateway that services the PSTN of the dialed number. IRIDIUM™ gateways, located in key areas around the world, interconnect the IRIDIUM™ satellite network to PSTNs. IRIDIUM™ gateways comprise a Siemens EWSD-based D900 switch, and implement a communications protocol based on the GSM (Global System for Mobile Communications) cellular standard. The details of the IRIDIUM™ satellite communication system are shown in U.S. Patent No. 5,410,728 to Bertiger et al., entitled "Satellite Cellular Telephone and Data Communications System", assigned to Motorola, Inc., Schaumburg, Ill., and which is incorporated herein by reference.

To interface with the IRIDIUM™ satellite communication network, the satellite communication device 130 in the preferred embodiment of the present invention provides the functionality of an IRIDIUM™ subscriber unit described above in that it is capable of sending and receiving digital voice and data messages to and from the IRIDIUM™ satellite network. Accordingly, the satellite communication device 130 preferably includes a voice processor, consisting of a digital vocoder for converting digital voice messages to an analog signal and vice versa, a speaker for recreating the voice from the analog voice signal, and a microphone for converting voice to an analog voice signal.

The geo-location device 140 is preferably implemented to provide the functionality of a GPS receiver, which utilizes signals transmitted from a Global Positioning System (GPS) satellite constellation to determine its location. As known in the art, the GPS is a satellite-based radio-navigation system which is intended to provide highly accurate three-dimensional position information to GPS receivers at or near the surface of the Earth. The U.S. government has designated its GPS satellite constellation the "NAVSTAR". Analogous systems include the GLONASS constellation developed by the former Union of Soviet Socialist Republics (U.S.S.R), and the two European systems NAVSAT and GRANAS which are currently being developed. In the NAVSTAR GPS, four orbiting GPS satellites exist in each of six separate circular orbits. The satellite orbits are neither polar nor equatorial, but rather lie in mutually orthogonal inclined planes. Each NAVSTAR GPS satellite orbits the Earth approximately once every 12 hours. Because the Earth rotates on its axis once every 24 hours, each satellite completes exactly two orbits during the single revolution of the Earth. The position of each satellite at any given time is precisely known and is continuously transmitted to the Earth as "ephemeris" data. In addition to the ephemeris data, the navigation signal transmitted by each satellite includes a precise time at which the signal was transmitted. A GPS receiver on or near the surface of the Earth operates as a sensor device which passively receives ephemeris data that is transmitted continuously from GPS satellites and then translates that data into the absolute positional location (i.e., latitude, longitude, altitude relative to the center of the Earth) of the GPS receiver. The use of a GPS receiver for providing the functionality of the geo-location device 140 in the preferred embodiment of the present invention provides several advantages over other positioning methods. In other satellite based positioning systems, the device must transmit a request for positioning data, which ultimately reveals the location of the requesting device. There are many applications where this is not desirable (e.g., military applications, commercial and military recovery of lost equipment). In addition, the power required for the transmission sequence required to request, authenticate and receive positional information is greater than that required for a passive sensor device such as a GPS receiver, which merely receives and processes information. Accordingly, the use of a GPS receiver as the geo-location device 140 improves the life-time of the autonomous interrogatable information and position device if it is battery powered.

GPS satellites typically transmit ephemeris data signals in the band between 1.227 and 1.575 GHz. IRIDIUM™ subscriber unit (ISU) communication links typically occupy the band between 1.610 and 1.6265 GHz. Accordingly, in the preferred embodiment signals from GPS satellites and IRIDIUMI satellites are preferably handled by a single antenna, shown in FIG. 2 at 116, in order to conserve space and lower manufacturing costs.

To implement the autonomous interrogatable information and position device 100 with a single antenna 116, each of the GPS receiver 14 and the satellite communications device 18 are coupled via a Transmit/Receive (T/R) switch or signal splitting device 114 to the antenna 116. In the preferred embodiment, the T/R switch or signal splitting device 114 operates to isolate the GPS receiver 140 when the satellite communication device 130 is transmitting. When the satellite communication device 130 is in a receive mode, then RF signals received by antenna 116 are routed to both the GPS receiver 140 and the satellite communication device 130. Signal splitters are known in the art and commercially available. Accordingly, the T/R switch or signal splitting device 114 may be implemented with any such suitable device configured to operate within the particular implementation of the device of the present invention.

As shown in FIG. 2, the communications controller 112 of the preferred embodiment includes a high-power transmitter portion 115 for formatting digital messages into digitized packets, modulating digitized packets with an RF carrier, and transmitting the modulated signals to the satellite communications network (not shown). As also shown in FIG. 2, the communications controller 112 includes a receiver portion 113 which receives RF signals from the L band antenna 116 via the T/R switch or signal splitting device 114, demodulates the RF signal to extract the digitized packets, strips off the header information from the digitized packets, and sends the message bodies of the packets to the appropriate portion of the autonomous interrogatable information and position device 100 to be processed. A message may be sent to different portions of the autonomous interrogatable information and position device 100 depending on the type of message received. Voice messages are preferably sent to the satellite communications device 130 in the signal processor 120 to be converted to an analog voice signal which may be output over a speaker. Interrogation messages or command/control messages are preferably sent to the system controller 106 to be processed.

The autonomous interrogatable information and position device 100 also includes an I/O port 122 that is coupled to the system controller 106. The I/O port 122 is configured to allow the device 100 to be coupled to external sensors and or equipment 124. The I/O port 122 allows the device 100 of the present invention to be used to monitor the status of or send control signals or commands to external sensors and or equipment 124 local to the site of the device 100 from a remote location.

The system controller 106 of FIG. 2 manages the operation of the autonomous interrogatable information and position device 100. As described above, the system controller 106 is coupled to receive interrogation and command/control messages from the communications controller 112 or satellite communications device 130, coupled to receive the positional location from the geo-location device 140, and coupled to receive sensor data from external sensors or equipment 124 read via I/O port 122. The system controller 106 may be provided with preprogrammed operational sequences to execute upon detection of a particular status of the sensor data or particular positional location as determined by the geo-location device 140, or upon receipt of a given interrogation or command/control message received via the satellite communications device 130. In such case, the system controller 106 is preferably provided with program memory. Alternatively, the system controller 106 may be implemented to perform only simple operations such as reading from the I/O port or obtaining the positional location in response to an interrogation message, or sending control signals to the I/O port or internal components of the device 100 itself in response to a command/control message.

The preferred embodiment of the autonomous interrogatable information and position device 100 preferably includes a user interface 108 such as a display and keyboard for allowing a user to initiate a call, send a message, obtain local position status or local site sensor data, and or process the information locally.

The preferred embodiment of the autonomous interrogatable information and position device 100 also includes a cryptographic processor 118 for providing message encryption and or decryption capability. A cryptographic processor 118 is desirable in applications requiring security when transmitting confidential information. In the preferred embodiment, encryption and decryption are performed on the data field of the information packet, which is what the IRIDIUM™ satellite communication system currently supports. The cryptographic processor 118 may be implemented using any encryption/decryption algorithm suitable for the application at hand (e.g., a Type I, II, or III DES (Digital Encryption Standard algorithm).

To provide mobility, the autonomous interrogatable information and position device 100 is preferably powered with a battery 102. To enhance the lifetime of the battery 102, device 100 is preferably provided with a power converter/controller 104 and a power switch 110. The power converter/controller 104 operates to place essential portions of the device 100 into a "sleep" mode and to cause the power switch 110 to turn off non-essential portions of the device 100 when the device 100 is idle. Accordingly, in a device 100 supplied with a power converter/controller 104, the cryptographic processor 118 and communications controller 112 may be shut off unless a message is being transmitted or received. In the preferred embodiment, if the autonomous interrogatable information and position device 100 is in sleep mode, it may be activated by sending it an activation (or "wake up") signal. This activation signal is provided by a paging receiver 126 which may be a terrestrial or satellite based paging communication system receiver. In the preferred embodiment, this is implemented using an IRIDIUM™ based paging function.

In a preferred implementation of the invention, the power converter/controller 104 and power switch 110 may be utilized to conserve power in positional tracking applications by implementing a unique power management algorithm that is based on the distance that the device 100 has moved since its last position update. In this implementation, power converter/controller 104 periodically powers up the geo-location device 140 using power switch 110 to determine its current position POS1. The position POS1 is stored in non-volatile memory within the system controller 106. The power converter/controller 104 then causes the geo-location device 140 to be powered down for an interval of time, or "sleep interval". At the end of the sleep interval the power converter/controller 104 powers up the geo-location device 140 using power switch 110 to determine its latest current position POS2. The latest current position POS2 is also stored in non-volatile memory within the system controller 106. The system controller 106 compares the values of POS1 and POS2, and adjusts the sleep interval accordingly. If the difference between POS2 and POS1 is less than a preselected amount, the sleep interval is increased. If the difference between POS2 and POS1 is more than a preselected amount, the sleep interval is decreased. This process continues, with the latest two position fixes maintained in non-volatile memory of the system controller 106 until a minimum or maximum interval limit has been reached. The rate of change may be smoothed by using the latest three or more position fixes rather than only the latest two.

The operation of the preferred embodiment device 100 of FIG. 2 is as follows. System power converter/controller 104, system controller 106, and receive portion 113 of the communications controller 112 are each powered continuously from battery 102. Since these functions consume a negligible amount of standby power from the battery 102, the useful life of the device 100 in this mode is several days. The system power converter/controller 104 and system controller 106 are operated in a low power "sleep" mode until the communications controller 112 receives a valid activation signal via the paging communications system network. In the preferred embodiment, this is accomplished via the IRIDIUM™ satellite communications network, utilizing a paging receiver 126 and standard IRIDIUM™ signaling protocol. The relatively high power transmit portion 1 of the communications controller 112, signal processor 1 and cryptographic processor 118 are held in the unpowered state by the appropriate control of a power switch 110. Upon receipt of a valid activation signal via the L band antenna 116, Transmit/Receive (T/R) switch or signal splitting device 114, and paging receiver 126, the receiver portion 113 of the communications controller 112 provides an activation or "wake up" signal to the system controller 106 which in turn activates additional portions of the device 100 which are in sleep mode. Depending on the message sent with the activation signal, the system controller 106 deto its internal p course of action according to its internal preprogrammed operational sequences or through instructions downloaded with the interrogation or command/control message. The system controller 106 receives an interrogation or a command/control message within the activation signal via the satellite communications device 130 in the signal processor 120. Representative interrogation or command/control messages may include: setup communication link, set transmitter power level, set voice or data mode, set encryption mode, report positional location, pass message, and load or clear encryption key. In the event of a report positional location interrogation message, the system controller 106 uses either a recently stored positional location, or enables the geo-location device 140 in the signal processor 1 through the appropriate control of the power switch 110 to determine a new positional location of the device 100. The cryptographic processor 118 may or may not be powered in the system depending on whether encryption is in use at the system level. Upon completion of the communications tasks (position reporting, message transfer, sensor data processing, etc.), the system controller 106 and the system power converter/controller 104 return to the low power "sleep" state until the next valid activation signal is received by the communications controller 112.

Figure 3:
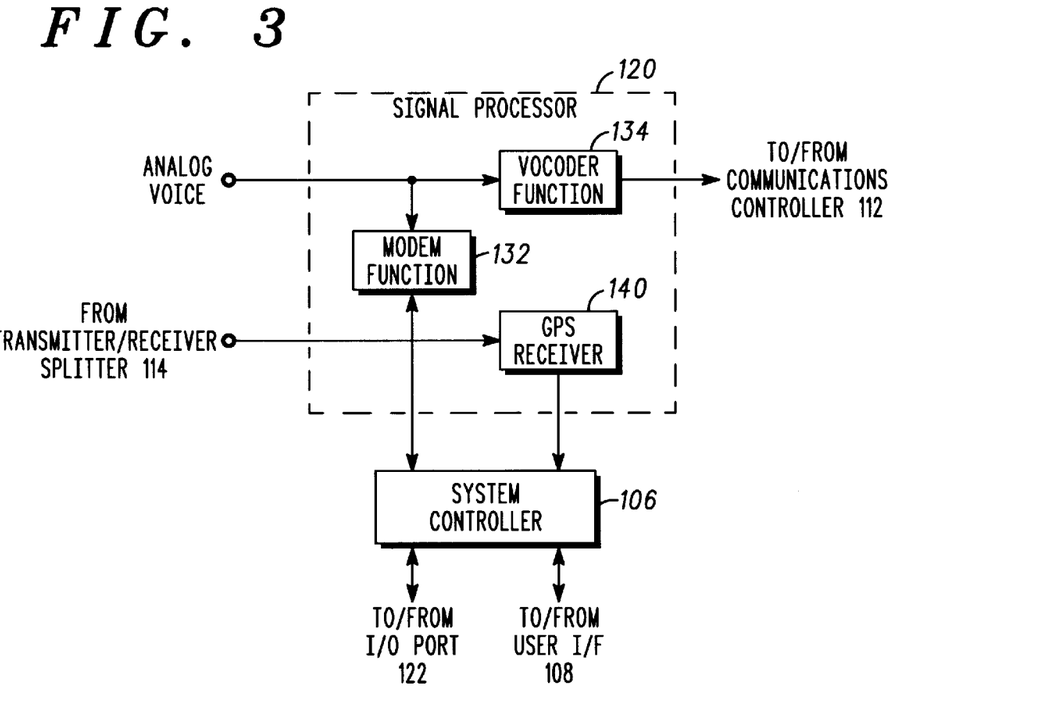
FIG. 3 is a block diagram of one embodiment of the signal processing function block of FIG. 2.

FIG. 3 is a detailed block diagram of one embodiment of the signal processor 120 of the autonomous interrogatable information and position device 100 of FIG. 2. As shown in FIG. 3, the system controller may receive data from several sources, including positional location data from GPS receiver 130, sensor data from I/O port 122, and user input data from user interface 108, all of which may be transmitted to the satellite communications network as a message. As described previously, the system controller 106 may also generate messages containing internal component status or as the result of processing preprogrammed operational sequences or received command messages. In each of the above-mentioned situations, when a data message is to be transmitted, the system controller 106 formats a data packet containing the message and appropriate header information. The signal processor 1 of the embodiment shown in FIG. 3 includes a modem function 132 and a vocoder function 134. The preferred embodiment is a MSK modem. MSK modems are known in the art. MSK modems employs minimum shift keying (MSK) modulation to addresses the spectral congestion problem resulting from the ever increasing demand for digital transmission channels in the radio frequency (RF) band. The modem function 132 encodes a digital data stream into a two tone format using tones within the audio range. One frequency represents a digital one and another frequency represents a digital zero. The modem function 132 also performs the inverse decoding function to recreate the original digital data stream.

Vocoders are also well known in the art and are used to convert between analog speech and a digital format suitable for transmission via radio. Analog signals (such as voice) are converted in a vocoder to a digital signal using a conversion format having a specified sampling frequency and a particular data compression technique. The compressed data is inserted in data packets and combined with time division or code division multiplexed signal and transmitted, via radio, to the receiver. The receiver demodulates the time division or code division multiplexed signal and decompresses and resembles the data in a process complementary to the conversion prior to transmission. This produces a reproduced analog signal at the receiver.

In the embodiment of the signal processor 1 shown in FIG. 3, formatted data packets generated by the system controller 106 are sent through modem function 132 as a digital data stream, where they are converted to audio tones. The tones are then digitized by vocoder function 134 and transferred to the communications controller 112 where they are modulated with an RF carrier and transmitted to the satellite communications network over antenna 116 (see FIG. 2).

When messages are received by the communications controller 112, the digitized data packets are demodulated and extracted from the RF signal, and the audio tones associated with the message are recreated by the vocoder function 134 from the digitized data packets. The tones are then decoded by the modem function 132 and passed on to the system controller 106 as a digital data stream. This data stream is preferably error corrected and decrypted if appropriate by the cryptographic processor 118. The system controller 106 then initiates the proper action to be taken in response to the received message.

It will be appreciated by those skilled in the art that in the signal processor embodiment shown in FIG. 3, data must be processed by a modem in order to be transferred through the vocoder. A limit to this approach is that simultaneous voice and data communications are not possible.

Figure 4:
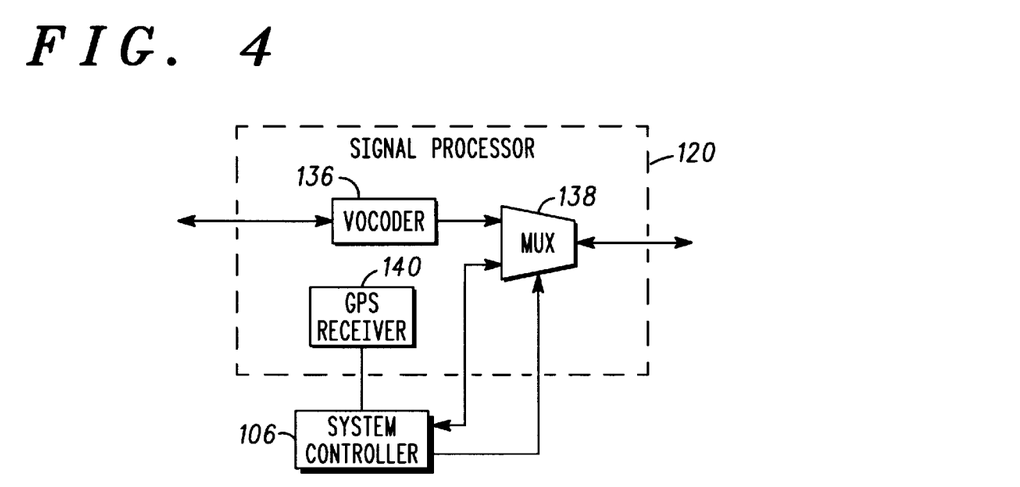
FIG. 4 is a block diagram of an alternative embodiment of the signal processing function block of FIG. 2.

FIG. 4 is a detailed block diagram of an alternative embodiment of the signal processor 120 of the autonomous interrogatable information and position device of FIG. 2 which without the use of a modem, allows voice and data messages to be interleaved, providing the user with a simultaneous voice and data communications. In this embodiment, the signal processor 120 includes a vocoder 136 and a multiplexer 138. Formatted data packets generated by the system controller 106 are multiplexed with voice data that has been digitized by vocoder 136 via multiplexer 138. The digital multiplexed data is transferred to the communications controller 112 where it is modulated with an RF carrier and communicated to the satellite communications network over antenna 116 (see FIG. 2).

When digitized packets are extracted from RF signals received by the communications controller 112, the digital voice data packets are routed first through multiplexer 138 and then through the vocoder 136 to recreate the analog voice signal, and the digital command/control and interrogation message packets are routed through multiplexer 138 to the microprocessor/system controller 106 where the data packet is decoded and acted appropriately upon.

The signal processor embodiment shown in FIG. 4 allows voice and data messages to be transmitted simultaneously. In this embodiment vocoder data packets are occasionally stolen from the voice path such that every once in a while one of the vocoder data packets transmits digital data messages instead of digitized voice messages in that data packet. This embodiment requires extra processing capability on the part of the system controller 106 because the system controller 106 must emulate a vocoder to generate a formatted packet that looks like a voice packet but is actually a command/control, interrogation, or response message packet. Because data packets are multiplexed with voice packets only once in a while, the deterioration in the quality of the voice signal at the receiving end of a call is minimal and preferably unnoticeable in a normal conversation. In addition, this embodiment requires a synchronization scheme to be implemented to allow a receiver on the other end of the call to distinguish between voice and data packets. One method of accomplishing this is to place a unique header on the packet.

It will be appreciated from the above description that the method and device of the present invention may be utilized in numerous applications. The combination of means for providing global communication of both voice and data, means for self-determining a precise positional location, input/output means which may be coupled to external sensors, devices or equipment, and control processing means which may be implemented with intelligence allows the present invention to be extremely versatile in applications of use.

Figure 5:
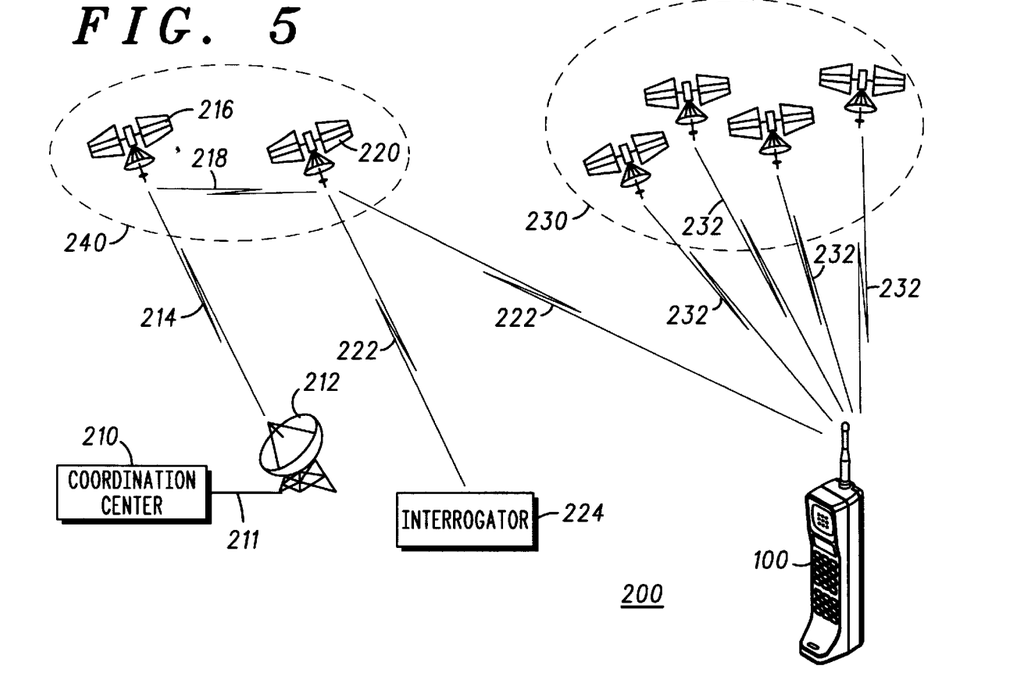
FIG. 5 is a system diagram of a remotely controlled survival communications system illustrating a specific application example of the device and method of the present invention.

FIG. 5 is a system diagram of a remotely controlled survival communications system illustrating a specific application example of the device and method of the present invention. As shown in FIG. 5, the remotely controlled survival communications system, shown generally at 200, includes a Search and Rescue (SAR) coordination center 210 in communication with an interrogation device 224 of a rescuer via a satellite gateway 212 and one or more satellites 216, 2of a satellite communications network 240. A person or entity to be rescued is equipped with an autonomous interrogatable information and position device 100 in accordance with the present invention. In the preferred embodiment, the autonomous interrogatable information and position device 100 employs a GPS receiver as its geo-location device, and accordingly may receive ephemeris data from a GPS constellation 230. Also in the preferred embodiment, the satellite communications network is preferably the IRIDIUM™ satellite network, and each of the SAR coordination center 210, interrogation device 224, and satellite communications device of the autonomous interrogatable information and position device 100 are subscribers of (i.e., have access to) the IRIDIUM™ communications system. In operation, the autonomous interrogatable information and position device 100 remains in a low power standby mode until a call is initiated via the IRIDIUM™ satellite cellular network 240. A rescuer may initiate a call to the autonomous interrogatable information and position device 100 using either an interrogation device 224 which possesses specialized digital data transmission, reception and cryptographic capabilities, or a standard IRIDIUM™ telephone through digital data transmission, reception and cryptographic equipment of the SAR Coordination Center 210 and gateway 212. Since each autonomous interrogatable information and position device 100 has a unique identification code in the IRIDIUM™ system, the process is preferably initiated by placing a call to that identification code. When the connection is made, a series of encrypted digital commands may be transmitted to instruct the autonomous interrogatable information and position device 100 to activate its internal GPS receiver, determine its positional location using the GPS satellite constellation 230 via GPS communications links 232, and automatically transmit its positional location and time in the form of a data message (preferably encrypted) back to the rescuer over either an IRIDIUM™ communications link 222 to the interrogation device 224 or over an IRIDIUM™ communications link 224, inter-satellite link 218, ground link 214 and ground communications link 211 to the SAR coordination center 210. Since the IRIDIUM™ satellite communications system provides global coverage, over the horizon search and rescue operations are possible through inter-satellite links 218 and ground communications links 214 via the global network of IRIDIUM™ gateways 212 and ground links 214. The remotely controlled survival communications system 200 may be used to locate and assist a user that would otherwise be unable to respond due to injuries. In such a case, the process can also be initiated either by the victim's autonomous interrogatable information and position device 100 by automatically calling the SAR Coordination Center 210 in the event the failure to reset a periodic interval timer or the detection of a catastrophic event through various sensors attached to the device (e.g. sensors to detect impact, water/moisture, poison gas, radiation, etc.). Assistance may be provided to the victim if the output port of the device 100 is attached to devices or equipment that respond to control signals downloaded through the output port (e.g., turn on oxygen or control temperature). The system can also be used to interchange digital data text messages with the survival communications device user, to activate rescue aids (such as strobe lights or smoke generators) or remotely update and/or purge encryption keys of the autonomous interrogatable information and position device 100.

Figure 6:
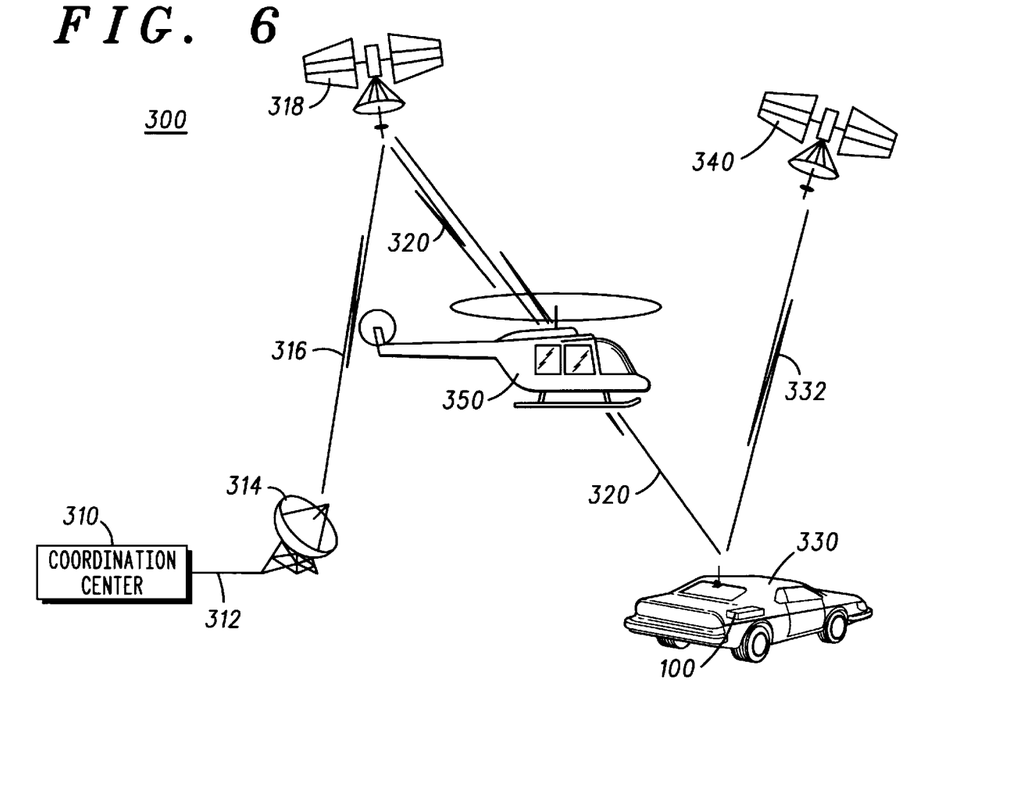
FIG. 6 is a system diagram of a vehicle tracking and location system illustrating another specific application example of the device and method of the present invention.

Another application of the autonomous interrogatable information and position device of the present invention is that of tracking and locating lost or stolen items. FIG. 6 illustrates a vehicle tracking and location system, shown at 300, which employs the autonomous interrogatable information and position device of the present invention. In the specific application of a lost or stolen vehicle locator, the autonomous interrogatable information and position device 100 is installed on a vehicle 330 in such a way as to minimize the possibility of detection or tampering. If the owner lost track of the vehicle 300 for any reason, a call can be initiated, through a coordination center 3to the unique identification code of the autonomous interrogatable information and position device 100 in the vehicle 330. The device 100 will then respond, as commanded by the interrogator, to determine its positional location via a GPS constellation 340 and ephemeris data transmitted over GPS downlinks 332, and to report its positional location and status via a response message. In the event of a theft, the vehicle 300 can be remotely disabled by sending the appropriate command to the autonomous interrogatable information and position device 100 which is coupled at its output port to disabling circuitry in the vehicle 330. Stand off tracking may also be provided to an airborne tracking vehicle 350 by using the GPS derived positional location relayed through the IRIDIUM™ M satellite network 318 over links 312, 316 and 320 from the coordination center 310 via gateway 314.

Yet another application involves the use of the autonomous interrogatable information and position device 100 as a means of requesting help for an individual in the event of a medical emergency. In such a system, the device 100 is preferably interfaced to a number a biomedical of physiological sensors to determine the health of the subject. In the event of an emergency, the device 100 automatically contacts the appropriate medical resources and reports the location of the individual and the nature of the problem. With such information, the appropriate response can be directed to the individual's location, or assistance can be provided remotely by sending control signals through the device 100 to biomedical equipment attached to the individual.

Clearly, the number of applications which may be facilitated by the device of the present invention are many. A number of possible local site sensors or equipment which illustrate the wide spectrum of use of the device, included herein by way of example only and not limitation, are: biological data sensors; biological sampling devices; physiological data sensors; medication dispensers; meteorological data sensors; geological or geophysical data sensors; locks, gates or access control devices; manned or unmanned vehicles, machinery, aircraft or boats; local installation or mobile equipment conditions such as equipment health, power conditions, fuel levels, intruder warning, malfunction warning; light, temperature, force, velocity, flow, position or other physical sensors; altitude detection devices; lighting or other electrically powered or initiated items; local computers or data processors to include compressed video; and local message input devices.

As will be appreciated from the above description, the present invention provides a multi-functional autonomous interrogatable and position device which may be employed in a wide variety of applications. The device provides geo-location capabilities and a voice/data satellite communications capabilities which allows a subscriber at one location on or near the surface of the earth to communicate and send voice and data back and forth between a subscriber at another location on or near the surface of the earth. In addition, the present invention also provides a data I/O and control port which allows a user to remotely monitor a status condition or information from a remote sensor or piece of equipment and or to be signaled upon existence of a specified condition. This configuration also allows a remote user to remotely control devices to which the control port of a device of the present invention is attached. In addition, because the geo-location and satellite communication telephone functionality are integrated into a single circuit, the size of the device may be significantly reduced.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An autonomous interrogatable information and position device, comprising:
   a satellite communications device for sending and receiving digital voice and data messages to and from a satellite communications network;
   a geo-location device for receiving positioning signals and for determining a positional location of said autonomous interrogatable information and position device without allowing external detection of said positional location;
   an input port, said input port configured to allow coupling of said autonomous interrogatable information and position device to external local site sensors to obtain external local site sensor data;
   voice input means;
   a voice message formatter for converting a voice signal received from said voice input means into a digital voice message for transmission to said satellite communications network via said satellite communications device; and
   a control processor coupled to said satellite communication device, said geo-location device, said voice input means, and said input port, said control processing being operable to monitor said positional location and said external local site sensor data, and being responsive to an interrogation message received by said satellite communications device to generate a response message in response to said interrogation message for transmittal to said satellite communications network via said satellite communications device.

2. The device of claim 1, wherein:
said geo-location device comprises a GPS receiver.

3. The device of claim 1, wherein:
said interrogation message is a request for said positional location of said autonomous interrogatable information and position device.

4. The device of claim 3, wherein:
said response message comprises said positional location.

5. The device of claim 1, wherein:
said autonomous interrogatable information and position device is coupled to said external local site sensors.

6. The device of claim 5, wherein:
said interrogation message is a request for said external local site sensor data.

7. The device of claim 6, wherein:
said response message comprises said external local site sensor data.

8. The device of claim 1, wherein:
said voice message formatter comprising a vocoder.

9. The device of claim 1, further comprising:
a voice message deformatter for converting a digital voice message received from said satellite communications network via said satellite communications device into a voice message; and
voice output means for converting said voice message into a voice signal.

10. The device of claim 8, further comprising:
a voice message deformatter for converting a digital voice message received from said satellite communications network via said satellite communications device into a voice message; and
voice output means for converting said voice message into a voice signal.

11. The device of claim 10, wherein:
said voice message formatter comprising a vocoder.

12. The device of claim 11, further comprising:
a modem for converting a data message generated by said control processor into an acoustic signal; and
a voice message formatter for converting said acoustic signal into a digital data message for transmission to said satellite communications network via said satellite communications device.

13. The device of claim 8, further comprising:
a modem for converting a data message generated by said control processor into an acoustic signal; and
wherein said voice message formatter converts said acoustic signal into a digital data message for transmission to said satellite communications network via said satellite communications device.

14. The device of claim 8, further comprising:

a multiplexer coupled to receiver and multiplex digital voice messages from said voice message formatter and digital data messages generated by said control processor to generate a stream of digital messages for transmission to said satellite communication network.

15. The device of claim 14, wherein:

said satellite communications device formats each of said digital messages into a data packet, said data packet having a special header to indicate to a receiving entity whether said digital message is a digital voice message or a digital data message.

16. The device of claim 1, further comprising:

a cryptographic processor for encrypting said digital messages sent to said satellite communications network, and for decrypting said digital messages received from said satellite communications network.

17. The device of claim 1, wherein:

said control processor is responsive to an instruction message and operable to carry out one or more commands in response to said instruction message.

18. The device of claim 17, wherein:

said instruction message comprises one or more commands to control said geo-location device.

19. The device of claim 1, further comprising:

an output port, said output port configured to allow coupling of said autonomous interrogatable information and position device to one or more external local site devices to control said one or more external local site devices.

20. The device of claim 19, wherein:

said control processor is responsive to an instruction message and operable to carry out one or more commands in response to said instruction message.

21. The device of claim 20, wherein:

said instruction message comprises one or more commands to output a set of control signals to said one or more external local site devices.

22. The device of claim 1, comprising:

a power source for providing power to said autonomous interrogatable information and position device.

23. The device of claim 22, further comprising:

an activation device having an output for indicating detection of an activation signal;

a power controller switchably connected between said power source and first portions of said autonomous interrogatable information and position device and operable in response to said activation device to establish power source connections to said first portions when said activation signal is detected.

24. The device of claim 23, wherein:

said activation device comprises a terrestrial based pager;

said activation signal comprises a pager message; and said terrestrial or satellite based pager and a receive portion of said satellite communications device are configured to continuously receive power from said power source.

25. The device of claim 24, wherein:

said power controller is configured to establish low-power connections between said power source and second portions of said autonomous interrogatable information and position device, and operable in response to said activation device to establish high-power source connections to said second portions when said activation signal is detected.

26. The device of claim 1, wherein:

said control processor executes preprogrammed operational sequences of instructions to generate said response message in response to said interrogation message.

27. The device of claim 1, wherein:

said control processor is configured to initiate a call to said satellite communications network.

28. The device of claim 1, wherein:

said control processor is configured to initiate a call to said satellite communications network at periodic intervals to report said positional location.

29. The device of claim 1, wherein:

said control processor is configured to initiate a call to said satellite communications network in response to a pre-defined condition detected by said local site sensors.

30. The device of claim 5, wherein:

said control processor is configured to initiate a call to said satellite communications network at periodic intervals to report said external local site sensor data.

31. A method for determining a positional location and local site information of a remote entity, said method comprising the steps of:

providing at said remote entity an autonomous interrogatable information and position device comprising:

a satellite communications device for sending and receiving digital messages to and from a satellite communications network;

a geo-location device for receiving a positioning data signal and for determining said positional location without allowing external detection of said positional location;

an input port; and a control processor coupled to said satellite communication device, said geo-location device, and said input port, said control processor being operable to monitor said positional location and input data received at said input port, and said control processor being responsive to an interrogation message received by said satellite communications device to generate a response message for transmission to said satellite communications network via said satellite communications device;

coupling said input port of said autonomous interrogatable information and position device to local site sensors of interest local to said remote entity;

causing said autonomous interrogatable information and position device to monitor said positional location as determined by said geo-location device and local site sensor data received at said input port;

transmitting an interrogation message to said autonomous interrogatable information and position device;

receiving a response message from said autonomous interrogatable information and position device.

32. The method of claim 31, wherein:

said interrogation message comprises a request for said positional location.

33. The method of claim 32, wherein:

said response message comprises said positional location.

34. The method of claim 31, wherein:

said interrogation message comprises a request for said local site sensor data.

35. The method of claim 34, wherein:

said response message comprises said local site sensor data.

36. The method of claim 31, wherein:

said autonomous interrogatable information and position device comprises an output port and is responsive to a command message to output signals to said output port, said method further comprising the step of:

coupling said output port to one or more control inputs of one or more external devices local to said remote entity.

37. The method of claim 36, further comprising the step of:

transmitting said command message to, and thereby causing, said autonomous interrogatable information and position device to output control signals to, and to thereby remotely control, said one or more external devices.

38. A system for remotely tracking and monitoring local conditions of a remote entity, comprising:

an autonomous interrogatable information and position device, comprising:
a satellite communications device for sending and receiving digital messages to and from a satellite communications network;
a geo-location device for receiving positioning signals and for determining a positional location of said autonomous interrogatable information and position device without allowing external detection of said positional location;
an input port, said input port configured to allow coupling of said autonomous interrogatable information and position device to external local site sensors to obtain external local site sensor data; and
a control processor coupled to said satellite communication device, said geo-location device, and said input port, said control processing being operable to monitor said positional location and said external local site sensor data, and being responsive to an interrogation message received by said satellite communications device to generate a response message in response to said interrogation message for transmittal to said satellite communications network via said satellite communications device;

one or more site sensors configured to detect conditions of interest local to said remote entity, said autonomous interrogatable information and position device being coupled to receive input data from said one or more site sensors via input port; and a second satellite communications device configured to generate said interrogation message and receive said response message.

39. The system of claim 35, wherein:

said interrogation message comprises a request for said positional location.

40. The system of claim 39, wherein:

said response message comprises said positional location.

41. The system of claim 38, wherein:

said interrogation message comprises a request for said input data received at said input port of said autonomous interrogatable information and position device.

42. The system of claim 41, wherein:

said response message comprises said input data received at said input port of said autonomous interrogatable information and position device.

43. The system of claim 38, wherein:

said autonomous interrogatable information and position device comprises:

an output port, said output port being responsive to a command message received via said satellite communications device to output signals to said output port.

44. The system of claim 43, wherein:

said output port is coupled to control inputs of one or more devices; and said command message causes said autonomous interrogatable information and position device to output control signals to, and thereby provides remote control of, said control inputs of said one or more devices via said output port.

45. An autonomous interrogatable information and position device, comprising:

a satellite communications device for sending and receiving digital messages to and from a satellite communications network;

a geo-location device for receiving positioning signals and for determining a positional location of said autonomous interrogatable information and position device without allowing external detection of said positional location;

an input port, said input port configured to allow coupling of said autonomous interrogatable information and position device to external local site sensors to obtain external local site sensor data;

a control processor coupled to said satellite communication device, said geo-location device, and said input port, said control processing being operable to monitor said positional location and said external local site sensor data, and being responsive to an interrogation message received by said satellite communications device to generate a response message in response to said interrogation message for transmittal to said satellite communications network via said satellite communications device;

voice input means; and a voice message formatter for converting a voice signal received from said voice input means into a digital voice message for transmission to said satellite communications network via said satellite communications device.

46. An autonomous interrogatable information and position device, comprising:

a satellite communications device for sending and receiving digital messages to and from a satellite communications network;

a geo-location device for receiving positioning signals and for determining a positional location of said autonomous interrogatable information and position device without allowing external detection of said positional location;

an input port, said input port configured to allow coupling of said autonomous interrogatable information and position device to external local site sensors to obtain external local site sensor data;

a control processor coupled to said satellite communication device, said geolocation device, and said input port, said control processing being operable to monitor said positional location and said external local site sensor data, and being responsive to an interrogation message received by said satellite communications device to generate a response message in response to said interrogation message for transmittal to said satellite communications network via said satellite communications device;

a voice message deformatter for converting a digital voice message received from said satellite communications network via said satellite communications device into a voice message; and voice output means for converting said voice message into a voice signal.

47. An autonomous interrogatable information and position device, comprising:

a satellite communications device for sending and receiving digital messages to and from a satellite communications network;

a geo-location device for receiving positioning signals and for determining a positional location of said autonomous interrogatable information and position device without allowing external detection of said positional location;

an input port, said input port configured to allow coupling of said autonomous interrogatable information and position device to external local site sensors to obtain external local site sensor data; and a control processor coupled to said satellite communication device, said geo-location device, and said input port, said control processing being operable to monitor said positional location and said external local site sensor data, and being responsive to an interrogation message received by said satellite communications device to generate a response message in response to said interrogation message for transmittal to said satellite communications network via said satellite communications device, wherein said control processor executes preprogrammed operational sequences of instructions to generate said response message in response to said interrogation message.

48. An autonomous interrogatable information and position device, comprising:

a satellite communications device for sending and receiving digital messages to and from a satellite communications network;

a geo-location device for receiving positioning signals and for determining a positional location of said autonomous interrogatable information and position device without allowing external detection of said positional location;

an input port, said input port configured to allow coupling of said autonomous interrogatable information and position device to external local site sensors to obtain external local site sensor data;

a control processor coupled to said satellite communication device, said geo-location device, and said input port, said control processing being operable to monitor said positional location and said external local site sensor data, and being responsive to an interrogation message received by said satellite communications device to generate a response message in response to said interrogation message for transmittal to said satellite communications network via said satellite communications device, wherein said control processor is configured to initiate a call to said satellite communications network.

* * * * *